(12) United States Patent
Wagner

(10) Patent No.: US 6,655,616 B1
(45) Date of Patent: Dec. 2, 2003

(54) MANUAL GRINDER FOR GRAIN FOOD PRODUCTS

(75) Inventor: Armand Wagner, Esch/Alzette (LU)

(73) Assignee: L & M Services B.V., Amsterdam (NL)

( * ) Notice: Subject to any disclaimer, the term of this patent is extended or adjusted under 35 U.S.C. 154(b) by 0 days.

(21) Appl. No.: 09/831,217

(22) PCT Filed: Nov. 5, 1999

(86) PCT No.: PCT/EP99/08629

§ 371 (c)(1),
(2), (4) Date: Aug. 15, 2001

(87) PCT Pub. No.: WO00/27264

PCT Pub. Date: May 18, 2000

(30) Foreign Application Priority Data

Nov. 6, 1998 (LU) .................................................. 90316

(51) Int. Cl.⁷ ................................................. A47J 42/04
(52) U.S. Cl. ...................................... 241/169.1; 241/30
(58) Field of Search ...................... 241/30, 168, 169.1, 241/258, 259

(56) References Cited

U.S. PATENT DOCUMENTS

| 2,184,719 | A | * | 12/1939 | Mantelet | 241/169.1 |
| 3,371,874 | A | * | 3/1968 | Reeves et al. | 241/169.1 |
| 4,960,246 | A | * | 10/1990 | Fohrman | 241/169.1 |
| 6,196,481 | B1 | * | 3/2001 | Barbagli | 241/169.1 |

* cited by examiner

Primary Examiner—W. Donald Bray
(74) Attorney, Agent, or Firm—Fletcher Yoder

(57) ABSTRACT

The invention relates to a manual grinder for mounting on the neck (C) of a receptacle for foodstuffs in the form of grains, the grinder being characterized in that it comprises firstly a fixed ring (1) provided with a flange (11) for supporting it on the receptacle, which flange is downwardly extended by an inner sleeve (12) that is engaged in said neck (C) and that presents a toothed inner side wall (12a), and secondly a cap (2) rotatably mounted on said neck (C) covering said ring (1) and including a peripheral skirt (21) radially connected to a central bushing (22) having a toothed outer side wall (22a) that is engaged coaxially in said sleeve (12), so as to define between them a peripheral grinding zone (10).

11 Claims, 4 Drawing Sheets

MANUAL GRINDER FOR GRAIN FOOD PRODUCTS

Figure 1:
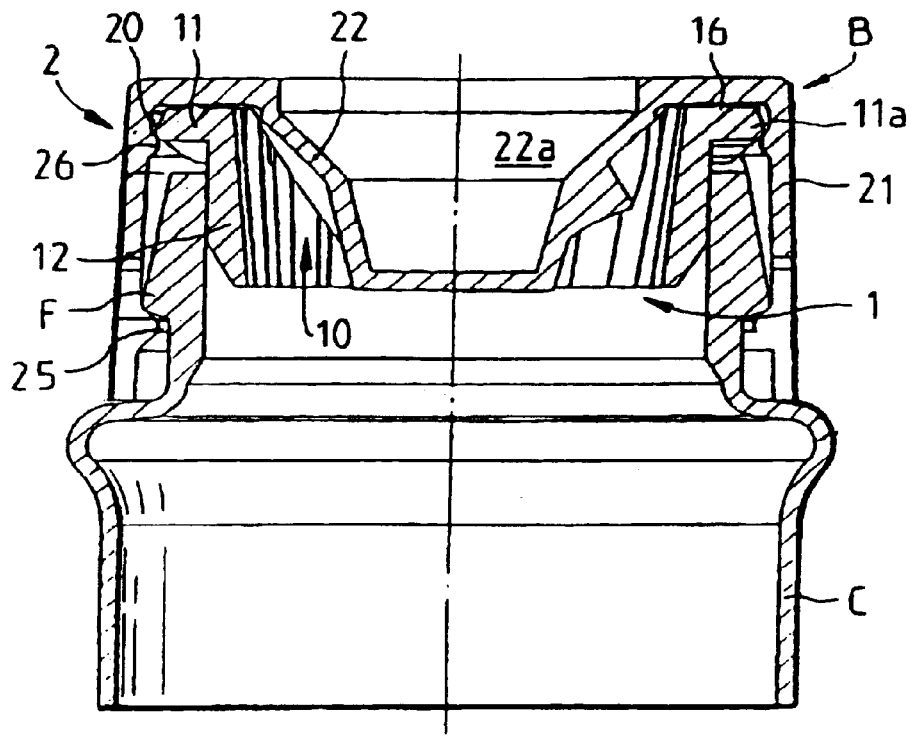

The present invention relates to a manual grinder for foodstuffs in the form of grains, such as spices.

Grinders or mills already exist that are designed to be mounted on the necks of receptacles that have been previously filled with grains in order to form a method of packaging and distribution ready for use.

However, those grinders are made in the form of at least two independent parts which need to be assembled together in a specific order before or after being mounted on the receptacle, thus implying manufacturing operations that are laborious and thus expensive.

Also, the operation of positioning the two moving parts that perform grinding relative to each other is awkward and difficult to check, and if it is not done correctly, there can arise serious problems in operation.

Furthermore, the fineness and thus the quality of grinding depends mainly on the narrowness of the intermediate zone between these two parts, which means that the assembly must be fitted together accurately and it is difficult to achieve this in automatic and reproducible manner on assembly and packaging lines.

An object of the present invention is to resolve these technical problems in satisfactory manner.

According to the invention, this object is achieved by means of a manual grinder for mounting on the neck of a receptacle for foodstuffs in the form of grains, the grinder being characterized in that it comprises firstly a fixed ring provided with a flange for supporting it on the receptacle, which flange is downwardly extended by an inner sleeve that is engaged in said neck and that presents a toothed inner side wall, and secondly a cap rotatably mounted on said neck covering said ring and including a peripheral skirt radially connected to a central bushing having a toothed outer side wall that is engaged coaxially in said sleeve, so as to define between them a peripheral grinding zone According to an advantageous characteristic, said skirt is radially connected to said bushing by means of bridges leaving between them outlet orifices for the ground foodstuff.

Preferably, said bridges lie in the plane of the top face of said cap.

According to another characteristic, said peripheral skirt is provided with snap-fastening members for cooperating with complementary members carried by the neck of the receptacle.

In order to improve the flexibility of the skirt, it is possible also to provide local thinning of its wall thickness.

According to another characteristic, said support flange has locking members for locking it in rotation and designed to co-operate with complementary members carried by the neck of the receptacle.

In a particular variant, said locking members are constituted by a continuous series of teeth carried by the bottom face of said flange and designed to become locked on at least one complementary tooth formed on the top rim of the neck.

Preferably, each of said teeth of the flange and of the neck is constituted by a sloping face for absorbing rotary forces, and by a steeper face for transmitting said forces.

In another variant, said sleeve is radially clamped against the inner wall of said neck.

According to other characteristics, said rotary cap has an annular guide groove slidably receiving the peripheral edge of said flange, and the top face of said flange is provided with an annular rib that comes into sliding contact with the bottom face of the cap.

The grinder of the invention makes it possible automatically to obtain proper relative positioning of the moving cap and the fixed ring without it being necessary to provide indexing of these two parts relative to each other.

Furthermore, the ring is locked against rotation on the receptacle without sliding, thus providing good mechanical efficiency.

In addition, grinding quality is guaranteed by forces being transmitted automatically from the receptacle (which is rotated while in an upside-down position) to the toothed sleeve of the inner ring which then moves slightly closer to the toothed bushing of the cap which is held stationary by the user.

The grinder of the invention is thus constituted by only two parts which are easy to fabricate and to assemble and which can be installed quickly and securely on the receptacle while providing the assembly with an overall shape that is very ergonomic and compact.

Figure 2A:
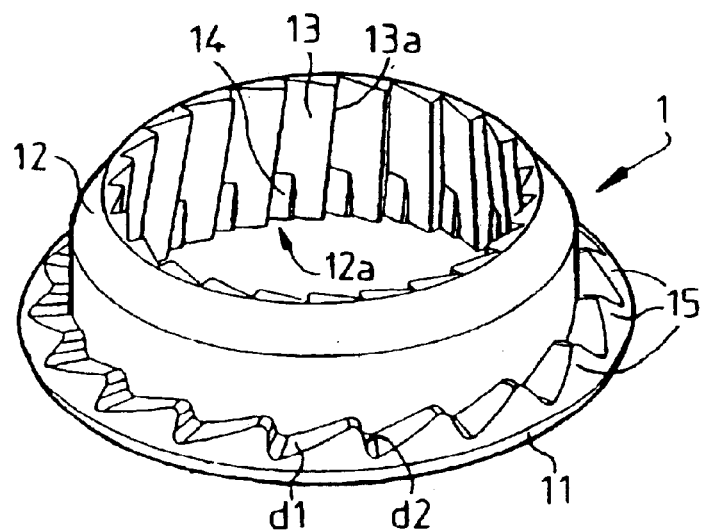
Figure 2B:
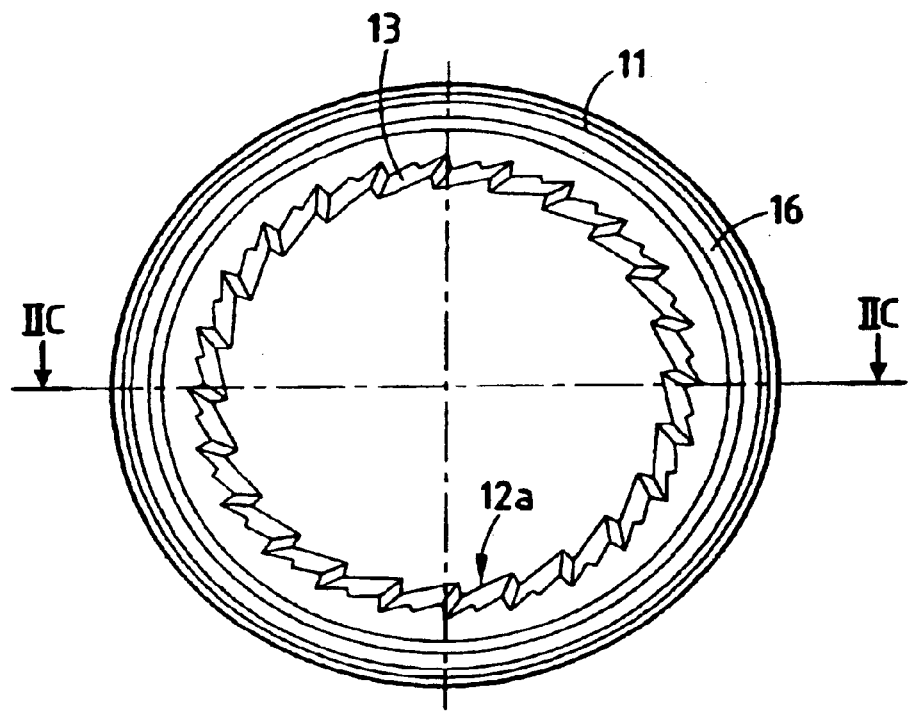
Figure 2C:
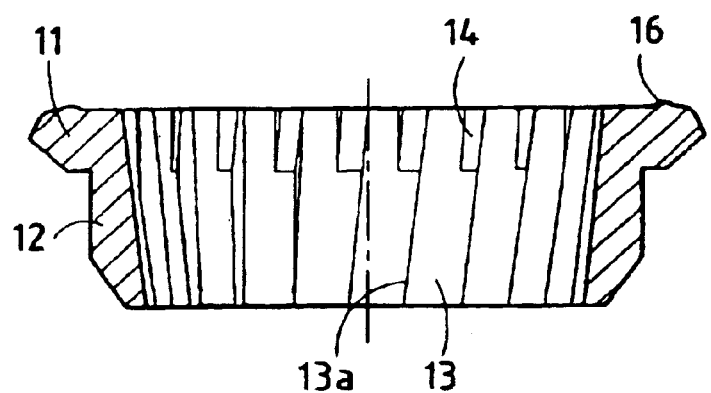
Figure 3A:
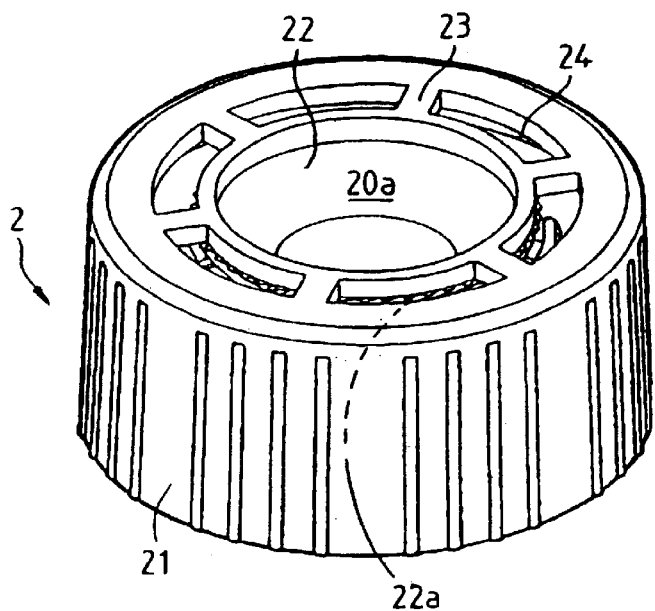
Figure 3B:
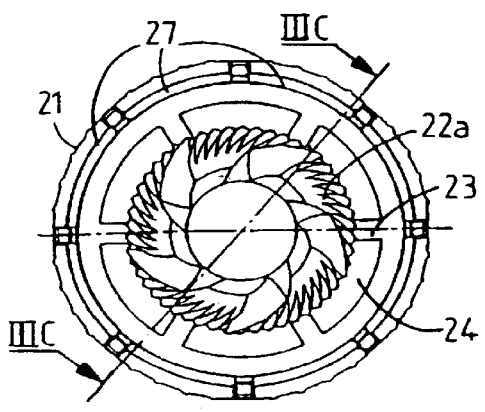
Figure 3C:
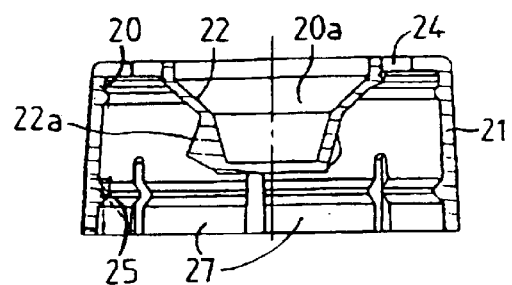
Figure 4A:
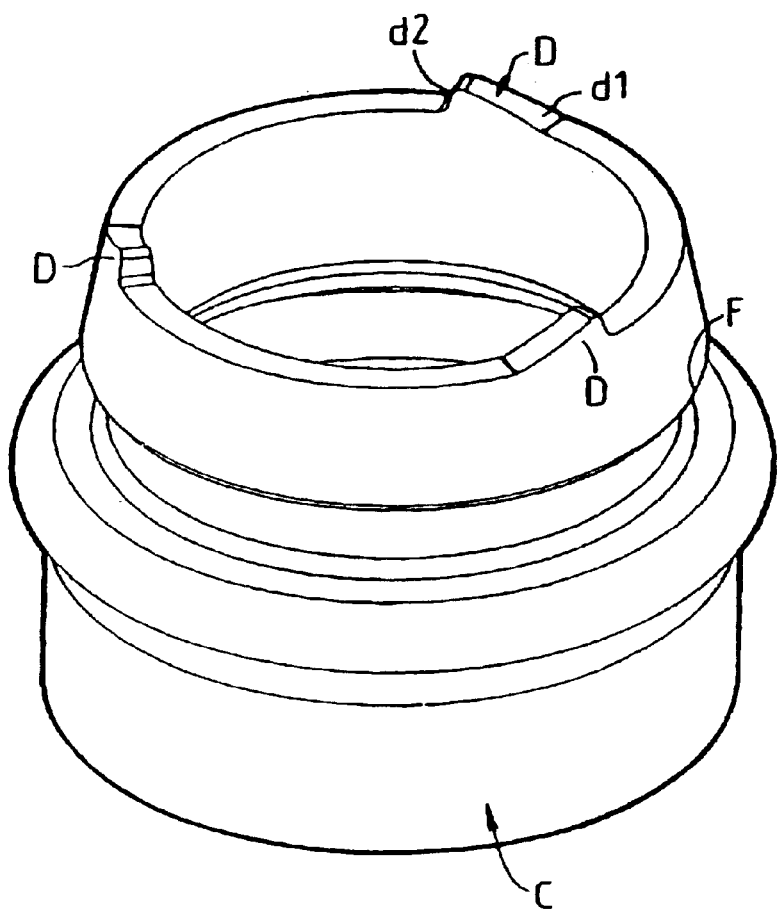
Figure 4B:
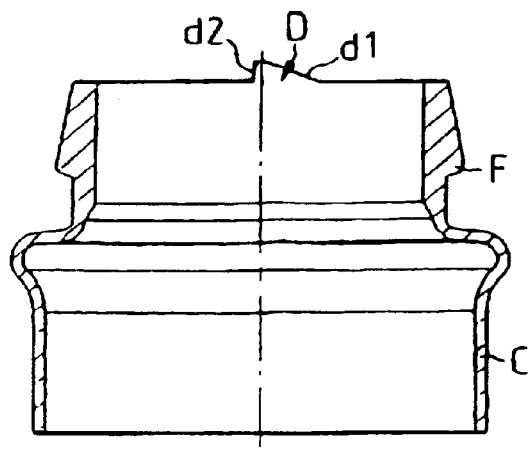

The invention will be better understood on reading the following description accompanied by the drawings, in which:

FIG. 1 is an overall section view of an embodiment of the invention;

FIGS. 2A, 2B, and 2C are detail views respectively in perspective, from above, and in section on AA of the ring in FIG. 1;

FIGS. 3A, 3B, and 3C are detail views respectively in perspective, from above, and in section on DD of the cap in FIG. 1; and FIGS. 4A and 4B are detail views respectively in perspective and in section of a variant embodiment of a receptacle neck suitable for the FIG. 1 embodiment of a grinder.

The grinder B shown in FIG. 1 is for mounting on a neck C of the receptacle containing a foodstuff in the form of grains (pepper, . . .) and for being actuated manually by the consumer.

The component parts of the grinder are assembled together prior to being delivered to the packager of the foodstuff who subsequently installs the grinder directly on the receptacle after it has been filled.

Consequently, the grinder is installed in such a manner that the receptacle is not intended to be refilled and is intended to be discarded after the foodstuff has been consumed.

The grinder comprises firstly a fixed ring 1 that is held stationary on the neck C of the receptacle, and secondly a covering cap 2 that is movable in rotation relative to said ring and said receptacle while being retained axially on said neck.

When the receptacle is placed head-down with its neck C at its bottom end, the cap 2 is held stationary by the user and the receptacle is then rotated relative to the cap 2, thereby driving the ring 1 so as to grind the grains which are suitable for penetrating into the intermediate zone and then dispense the resulting powder under gravity.

As can be seen more precisely in FIGS. 2A to 2C, the ring 1 is provided with a flange 11 for supporting it on the rim of the neck C.

The flange 11 is extended downwards by an inner sleeve 12 which is engaged in the neck C, preferably with radial clamping, the sleeve and the flange together defining a shoulder. The flange 11 has members for preventing it from rotating by co-operating with complementary members carried on the rim of the neck C.

In the embodiment shown in FIG. 2A, the bottom face of the flange 11 carries a series of teeth 15 suitable for locking on at least one complementary tooth D, and in FIG. 4A on three complementary teeth, formed on the top edge of the neck C.

Each of the teeth D and the teeth 15 is constituted by a sloping positioning face d1 and a steeper face d2 for providing rotary locking and guidance (see FIGS. 2A, 4A, and 4B).

This configuration makes it possible, merely by pressing on the cap 2, to wedge the teeth D on the neck C between the teeth 15 of the flange 11.

The inner side wall of the sleeve 12 has teeth extending up its full height. The edges 13a of the teeth 13 slope relative to cylindrical or frustoconical generator lines.

In their top portions, where they join the flange 11, the main faces of the teeth 13 are provided with sharp-edged fins 14.

The rotary cap 2 has a peripheral skirt 21 radially connected to a central bushing 22.

The outside of the skirt 21 is provided with fluting that makes it easier to hold.

The central bushing 22 is of tapering profile and it is engaged coaxially in the sleeve 12 so that its toothed outer side wall 22a faces the toothed inner side wall 12a of the sleeve 12, defining between them a peripheral grinding zone 10 of tapering profile.

The inclined face d1 serves to absorb excessive force imparted to the sleeve 12 when rotating the cap 2. The steep face d2 enables such forces to be transmitted from the receptacle to the sleeve 12 via the flange 11, thereby reducing the size of the grinding zone 10.

The bushing 22 has a flat-bottomed top cavity 22a.

The skirt 21 is connected to the bushing 22 by means of bridges 23 leaving between them orifices 24 for delivering the ground foodstuff. In this case, the bridges 23 lie in the plane top face of the cap 2.

The skirt 21 is provided with snap-fastening members such as a bead 25 for co-operating with complementary members carried by the neck C and implemented in this case in the form of an annular thread F (see FIGS. 1 and 4B).

When the cap is made out of a rigid material (such as a thermoplastic), the flexibility of the skirt 21 for snap-fastening purposes can be improved by local thinning 27 of its wall thickness (see FIGS. 3B and 3C) Thus.

Thus merely pressing on the cap 2 so as to hold the ring 1 captive serves simultaneously to snap-fasten the skirt 21 on the neck C and to lock the sleeve 12, thereby improving automatic positioning of the flange 11 that it is prevented from rotating.

The tendency of the ring 1 to move away from the neck C during rotation of the cap 2 is countered by cooperation between the snap-fastening members and the locking members.

The cap 2 also has an annular groove 20 for providing guidance in rotation which slidably receives the peripheral edge 11a of the flange 11.

The groove 20 is upwardly defined by the top face of the cap and downwardly defined by an annular protection 26 formed on the inner wall of the skirt 21.

The top face of the flange 11 is also provided with an annular rib 16 that comes into sliding contact with the bottom face of the cap, thereby forming a spacer.

What is claimed is:

1. A manual grinder for mounting on a neck of a receptacle for foodstuffs in the form of grains, the grinder comprising:

a fixed ring provided with a flange for supporting it on the receptacle, wherein the flange extends toward the receptacle by an inner sleeve that is engaged to the neck, wherein the ring presents a toothed inner side wall, and a cap rotatably mounted on said neck covering said ring and including a peripheral skirt radially connected to a central bushing having a toothed outer side wall that is engaged coaxially in said sleeve, so as to define between them a peripheral grinding zone.

2. A grinder according to claim 1, wherein said skirt is radially connected to said bushing by means of bridges leaving between them outlet orifices for the ground foodstuff.

3. A grinder according to claim 2, wherein said bridges lie in the plane of the top face of said cap.

4. A grinder according to claim 1, wherein said peripheral skirt is provided with snap-fastening members for co-operating with complementary members carried by the neck of the receptacle.

5. A grinder according to claim 1, wherein said support flange has locking members for locking it in rotation and designed to co-operate with complementary members carried by the neck of the receptacle.

6. A grinder according to claim 5, wherein said locking members are constituted by a continuous series of teeth carried by the bottom face of said flange and designed to become locked on at least one complementary tooth formed on the top rim of the neck.

7. A grinder according to claim 6, wherein each of said teeth of the flange and of the neck is constituted by a sloping face for absorbing rotary forces, and by a steeper face for transmitting said forces.

8. A grinder according to claim 1, wherein said sleeve is radially clamped against the inner wall of said neck.

9. A grinder according to claim 1, wherein said rotary cap has an annular guide groove slidably receiving the peripheral edge of said flange.

10. A grinder according to claim 1, wherein the top face of said flange is provided with an annular rib that comes into sliding contact with the bottom face of the cap.

11. A grinder according to claim 1, wherein said peripheral skirt includes local thinning of its wall thickness.

* * * * *